(12) United States Patent
Sarkar et al.

(10) Patent No.: US 8,437,769 B1
(45) Date of Patent: May 7, 2013

(54) METHOD AND SYSTEM FOR SELECTING A LENGTH OF A PREAMBLE TRANSMITTED IN AN ACCESS PROBE

(75) Inventors: Debasish Sarkar, Irvine, CA (US); Deveshkumar Rai, Overland Park, KS (US); Manoj Shetty, Overland Park, KS (US); Sachin R. Vargantwar, Overland Park, KS (US); Siddharth S. Oroskar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1030 days.

(21) Appl. No.: 12/033,617

(22) Filed: Feb. 19, 2008

(51) Int. Cl.
*H04W 24/00* (2009.01)

(52) U.S. Cl.
USPC .................. 455/456.1; 455/456.2; 455/456.3; 455/456.4; 455/456.5; 455/456.6

(58) Field of Classification Search .................. 370/335, 370/342; 455/456, 456.1, 456.2, 456.3, 456.5; 375/141, 142, 145, 149
See application file for complete search history.

(56) References Cited

U.S. PATENT DOCUMENTS

| | | | |
|---|---|---|---|
| 6,104,927 A * | 8/2000 | Willey | 455/435.1 |
| 6,161,022 A | 12/2000 | Hwang et al. | |
| 6,369,756 B1 * | 4/2002 | Wang et al. | 342/367 |
| 6,535,736 B1 | 3/2003 | Balogh et al. | |
| 6,741,580 B1 | 5/2004 | Kim et al. | |
| 6,967,935 B1 | 11/2005 | Park et al. | |
| 2002/0048317 A1 * | 4/2002 | Boer et al. | 375/219 |
| 2003/0050066 A1 * | 3/2003 | Tobe et al. | 455/446 |
| 2003/0125046 A1 * | 7/2003 | Riley et al. | 455/456 |
| 2004/0219931 A1 * | 11/2004 | Bi et al. | 455/456.1 |
| 2004/0264550 A1 * | 12/2004 | Dabak | 375/142 |
| 2006/0084432 A1 | 4/2006 | Balasubramanian et al. | |
| 2006/0105779 A1 * | 5/2006 | Uta et al. | 455/456.1 |
| 2006/0166671 A1 * | 7/2006 | Rajkotia et al. | 455/436 |

OTHER PUBLICATIONS

Vijay K. Garg, "IS-95 CDMA and cdma2000, Cellular/PCS Systems Implementation", Prentice Hall PTR, 2000, pp. 118-122.

* cited by examiner

*Primary Examiner* — Wesley Kim
*Assistant Examiner* — Dinh P Nguyen

(57) ABSTRACT

A mobile station transmits a message by transmitting an access probe that includes the message preceded by a preamble. The mobile station selects the length of the preamble from among a first preamble length and a second preamble length. The second preamble length is greater than the first preamble length. The mobile station makes the selection based, at least in part, on the distance between the mobile station and the mobile station's primary base transceiver station (BTS). If the distance is greater than a threshold distance, the mobile station selects the second preamble length. If the distance is less than the threshold distance, the mobile station selects the first preamble length, provided that an idle handoff to a neighboring BTS that is more than the threshold distance away is unlikely.

17 Claims, 3 Drawing Sheets

METHOD AND SYSTEM FOR SELECTING A LENGTH OF A PREAMBLE TRANSMITTED IN AN ACCESS PROBE

BACKGROUND

Wireless telecommunications systems typically include various types of forward link channels that are used to transmit signals from base transceiver stations (BTSs) to mobile stations and various types of reverse link channels that are used to transmit signals from mobile stations to BTSs. The reverse link channels may include reverse traffic channels that are assigned to mobile stations for particular communications sessions, such as voice calls, and access channels that mobile stations are able to use to communicate with the system. For example, a mobile station may use an access channel to originate a call or to respond to a page.

In certain types of air interfaces, access channel resources are not allocated to particular mobile stations. Instead, mobile stations may contend with one another for usage of an access channel. To contend for an access channel, a mobile station may make an "access attempt," for example, by transmitting a series of access probes. Each access probe may include the message that mobile station is trying to convey (e.g., a call origination message, page response, registration message, etc.). Within each access probe, the message may be preceded by a preamble. The preamble may be a predefined sequence of symbols that allows a BTS to recognize the beginning of the access probe and, thereby, receive the message contained in the access probe.

In accordance with IS-95 CDMA standards, the preamble is a sequence of zeroes (other standards may provide for other types of preambles), and the signals in the access probe are encoded by a "long" pseudonoise (PN) code that the mobile station generates using an access channel long code mask. The mobile station constructs the access channel long code mask based on parameters that relate to the BTS that is intended to receive the access probe. The known sequence of zeroes in the preamble allows the BTS to decode the signals in the access probe and, thereby, retrieve the message. In this regard, the preamble should be long enough so that the BTS has enough time to determine how to decode the signals in the access probe.

In IS-95 CDMA standards, the length of the preamble is defined by a size parameter, PAM_SZ. More particularly, the preamble has a length of 1+PAM_SZ frames, where each frame is a sequence of 96 "0" bits. PAM_SZ may take on integral values from 0 through 15, so that the preamble length may be between 1 and 16 frames. Typically, a wireless telecommunications system uses a fixed value for PAM_SZ, such as PAM_SZ=2.

OVERVIEW

In a first principal aspect, an exemplary embodiment provides a method for transmitting a message from a mobile station. In accordance with the method, a distance between the mobile station and a primary base transceiver station (BTS) is determined. A preamble length is selected based, at least in part, on the distance. The mobile station transmits the message with a preamble. The preamble has the selected preamble length.

In a second principal aspect, an exemplary embodiment provides a mobile station comprising a transceiver for transmitting and receiving wireless signals, a processor, data storage, and a plurality of program instructions stored in the data storage. The program instructions are executable by the processor to perform the steps of: (a) determining a distance between the mobile station and a primary base transceiver station (BTS); (b) selecting a preamble length based, at least in part, on the distance; and (c) controlling the transceiver so as to transmit the message with a preamble, the preamble having the selected preamble length.

DETAILED DESCRIPTION OF EXEMPLARY EMBODIMENTS

1. Introduction

Figure 1:
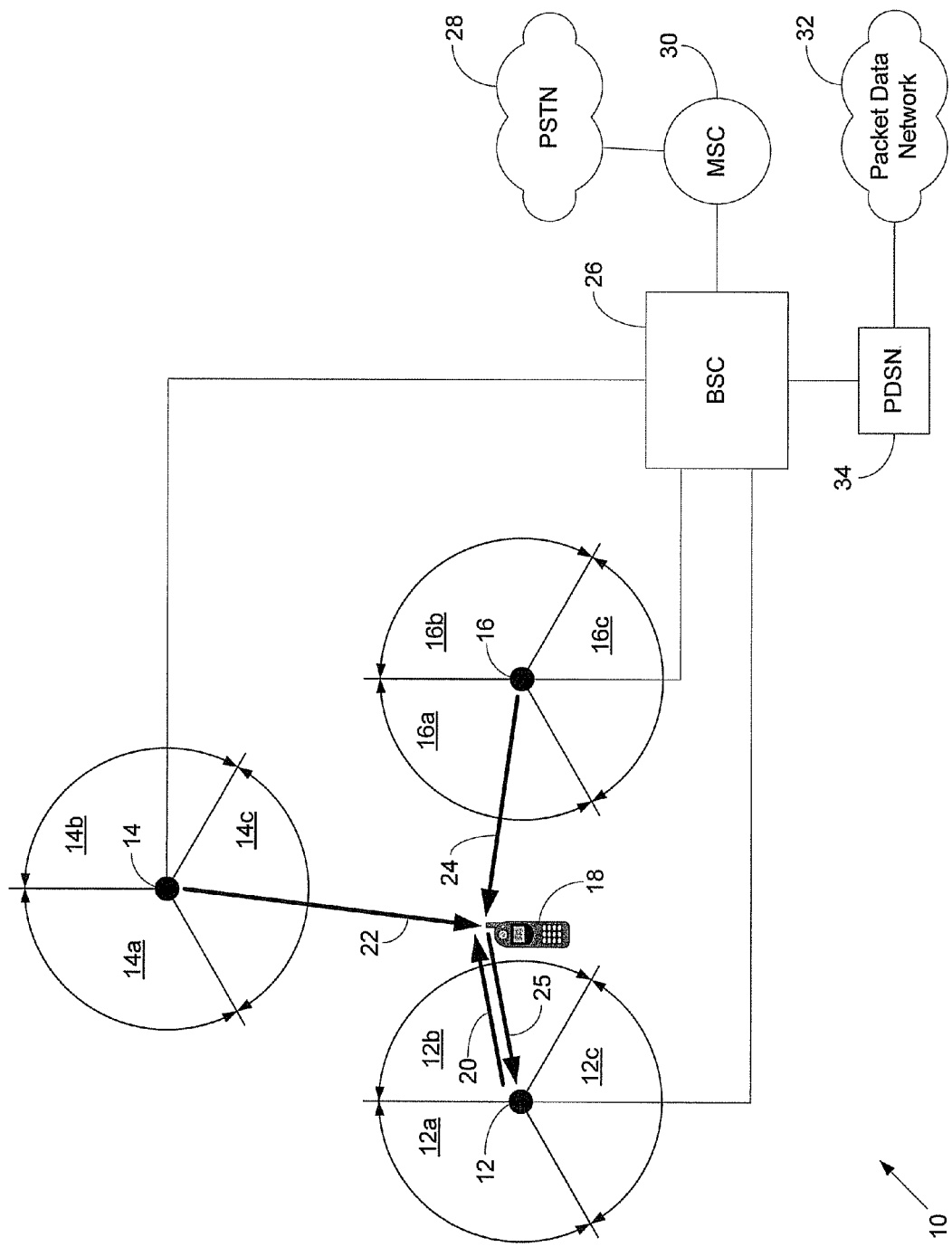
FIG. 1 is a block diagram of a wireless telecommunications system, in accordance with an exemplary embodiment.

The inventors have recognized that the selection of a length of a preamble in an access probe involves a trade-off between competing considerations. On the one hand, an access probe with a longer preamble will make it easier for a BTS to receive and decode the access probe. On the other hand, a longer preamble will also make the process of acquiring a mobile station's message take longer and will make "collisions" between access attempts by different mobile stations more likely to occur.

To address these problems, the inventors propose having the preamble length depend on the distance between the mobile station that will transmit the access probe and the base transceiver station (BTS) that is expected to receive the access probe. For example, different preamble lengths may be deemed appropriate for different distance ranges, with greater distances being associated with greater preamble lengths. In this way, a longer distance may result in a longer preamble, so as to facilitate more reliable reception and decoding of the access probe, and a shorter distance may result in a shorter preamble, so as to reduce the access time.

A mobile station may select the preamble length when the mobile station prepares to transmit a message (e.g., a call origination message). The selection may be based, at least in part, on the distance between the mobile station and the BTS intended to receive the message. The intended BTS could be the mobile station's "active set" or "primary" BTS, i.e., a BTS that is associated with a paging channel being monitored by the mobile station. To determine the distance to the intended BTS, the mobile station may obtain an estimate of its own location, obtain a location of the intended BTS, and calculate the distance between these locations.

The mobile station may then compare this distance to one or more threshold distances in order to determine which preamble length to use. For example, the mobile station might choose between two preamble lengths by comparing the distance to a single threshold distance. If the distance is greater than the threshold distance, the mobile station may use the longer preamble. If the distance is less than the threshold distance, the mobile station may use the shorter preamble. The mobile station may also take other factors into account. For example, the mobile station may also consider the distances to other BTSs that could potentially receive the access probe.

By selecting a preamble length based on distance, the preamble may beneficially be kept as short as practicable while still allowing access probes to be reliably received and decoded. This, in turn, may beneficially reduce the time taken up by a mobile station's access attempt, thereby reducing the time to set up a call (in the case that the message in the access probe contains a call origination message) or for the wireless telecommunications system to otherwise receive the message and respond to the mobile station. In addition, occupancy of the access channel may beneficially be reduced, thereby reducing the likelihood of "collisions" in which two or more mobile stations contend for the access channel at the same time.

2. Exemplary Network Architecture

FIG. 1 illustrates an exemplary wireless telecommunications system 10 in which exemplary embodiments may be employed. System 10 includes a plurality of base transceiver stations (BTSs), exemplified in FIG. 1 by BTSs 12, 14, and 16. Each BTS may be able to wirelessly communicate with mobile stations, such as mobile station 18. Mobile station 18 could be a wireless telephone, wireless personal digital assistant, wireless e-mail device, wirelessly-equipped laptop computer, or other wireless communication device.

Each BTS may include a plurality of transmitters and a plurality of receivers (the transmitters and receivers may be integrated into transceivers) for wireless communication with mobile stations, such as mobile station 18. Moreover, each BTS may include directional antennas to define a plurality of sectors. For example, BTS 12 may define sectors 12a, 12b, and 12c, BTS 14 may define sectors 14a, 14b, and 14c, and BTS 16 may define sectors 16a, 16b, and 16c. Although FIG. 1 shows each BTS with three sectors, it is to be understood that a BTS may have a greater or fewer number of sectors. Moreover, it is to be understood that the illustration of sectors in FIG. 1 is schematic only and that FIG. 1 is not intended to illustrate the precise geographic area covered by any sector.

The wireless communication between a mobile station and a sector of a BTS may occur via one or more forward link channels (for communications from a transmitter in the sector to the mobile station) and one or more reverse link channels (for communications from the mobile station to a receiver in the sector). In the case of IS-95 CDMA, the forward link channels may include a pilot channel, a sync channel, paging channels, and forward traffic channels, and the reverse link channels may include access channels and reverse traffic channels.

The signals in the forward link channels of a sector may each have a phase that is specific for that sector. That way, the mobile station can identify signals from different sectors based on phase. For example, mobile station 18 may receive a pilot signal 20 from a transmitter in BTS 12 associated with sector 12b, a pilot signal 22 from a transmitter in BTS 14 associated with sector 14c, and a pilot signal 24 from a transmitter in BTS 16 associated with sector 16a. Mobile station 18 may distinguish between pilot signals 20-24 based on their phases. In the case of IS-95 CDMA, pilot signals 20-24 are each spread by the same "short" pseudonoise (PN) code, but the beginning of the PN code occurs at a different time offset for each of pilot signals 20-24. Thus, mobile station 18 may distinguish pilot signals 20-24 based on different PN offsets.

Different reverse link signals may be distinguished by the use of different "long" PN codes. In this regard, FIG. 1 shows mobile station 18 transmitting an access probe 25 for receipt by BTS. In the case of IS-95 CDMA, access probe 25 is encoded by a "long" PN code that mobile station 18 generates using an access channel long code mask. Mobile station 18 constructs the access channel long code mask based on a base station identifier that identifies BTS 12, the PN offset of pilot signal 20, an access channel number used by sector 12b, and a paging channel number used by sector 12b. Access probe 25 contains a preamble followed by a message from mobile station 18. Mobile station 18 selects the length of the preamble, as described in more detail below. BTS 12 may receive access probe 25, decode access probe 25 based on the known content of the preamble (e.g., a sequence of "0" bits), and then retrieve the message.

Mobile station 18 may prepare to transmit access probe 18 while in an idle state. The idle state is a state in which mobile station 18 is not currently involved in a communication session but still monitors at least one paging channel so as to receive messages from wireless telecommunications system 10. Mobile station 18 also periodically measures the strengths of pilot signals, such as pilot signals 20-24, in the idle state. In particular, mobile station 18 may determine which sector has the strongest pilot signal and may designate that sector as its "active set" or "primary" sector. Mobile station 18 may then monitor a paging channel of the primary sector. For example, if pilot signal 20 has the highest signal strength of any pilot signal measured by mobile station 18, then sector 12b may be the primary sector and BTS 12 may be the primary BTS for mobile station 18.

Mobile station 18 may also determine which sectors have the next strongest pilot signals and may designate those sectors as "neighbor set" sectors. For example, if pilot signals 22 and 24 have the next highest signal strengths, as measured by mobile station 18, then mobile station 18 may add sector 14c and sector 16a to its neighbor set. Thus, BTS 14 and BTS 16 may be "neighbor set" BTSs for mobile station 18.

The pilot signal strengths measured by mobile station 18 may change while mobile station 18 is in the idle state. If the signal strength measured for pilot signal 24 (a neighbor set pilot signal) becomes sufficiently greater than the signal strength of pilot signal 20 (the active set or primary pilot signal), then mobile station 18 may change the designations of these pilot signals, moving pilot signal 24 to the active set and moving pilot signal 20 to the neighbor set. In addition, mobile station 18 may begin monitoring the paging channel of sector 16a (associated with pilot signal 24) instead of the paging channel of 12b (associated with pilot signal 20). This change of "active set" or "primary" sectors may be referred to as an "idle handoff."

BTSs 12, 14, and 16 may be controlled by a base station controller (BSC) 26. For example, BSC 26 may control the use of forward and reverse traffic channels for wireless communication between BTSs 12, 14, and 16 and mobile stations, such as mobile station 18. BSC 26 may be communicatively coupled to a circuit-switched network, such as public switched telephone network 28, e.g., via a mobile switching center 30. BSC 26 may also be communicatively coupled to a packet-switched network, such as packet data network 32, e.g., via a packet data serving node (PDSN) 34. Mobile stations, such as mobile station 18, may engage in communication sessions with various endpoints via PSTN 28 or packet data network 32, in order to exchange voice, data, or other media. For example, a mobile station may engage in a voice call with an endpoint via PSTN 28. Alternatively, a mobile station may engage in a data session with an endpoint via packet data network 32, e.g., for voice-over-packet (VoP) communication, to send or receive e-mail, to browse the World Wide Web, to receive streaming video and/or audio, to participate in Internet gaming, or for other purposes.

3. Exemplary Operation

Figure 2:
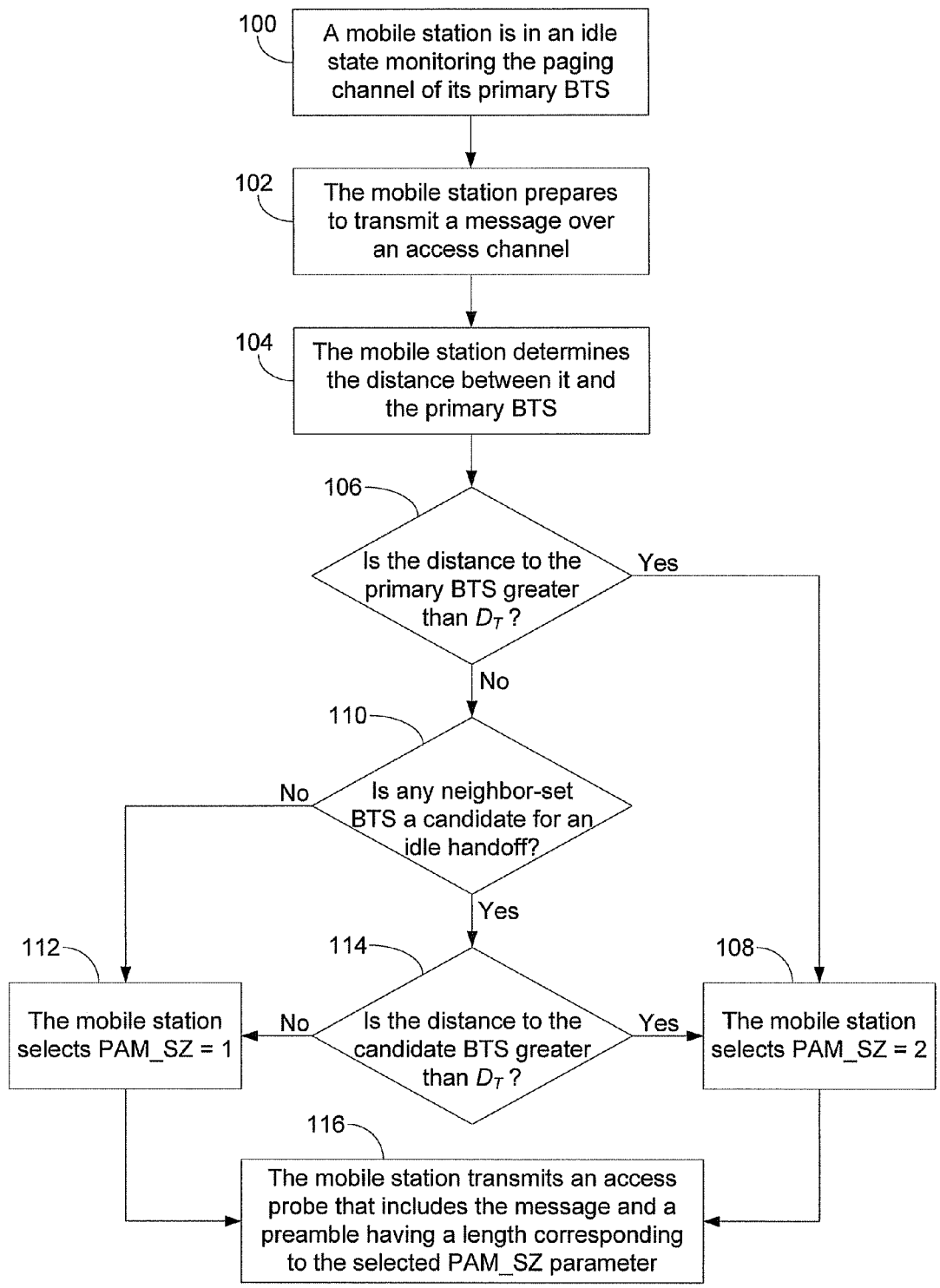
FIG. 2 is a flow chart illustrating a method of transmitting an access probe containing a message and a preamble, in accordance with an exemplary embodiment.

FIG. 2 is a flow chart illustrating an exemplary method of operation, in which a mobile station chooses between a longer preamble length (PAM_SZ=2) and a shorter preamble length (PAM_SZ=1). It is to be understood that choosing between two preamble lengths is exemplary only, as a mobile station could select from a preamble length from among a greater number of available preamble lengths.

The exemplary method is described with reference to wireless telecommunications system 10 illustrated in FIG. 1. It is to be understood, however, that other network architectures could be used. In addition, the exemplary method is described with reference to IS-95 CDMA. However, that other wireless communication protocols could be used. For example, certain aspects of the method could be applied to cdma2000, EV-DO, GSM/GPRS, or WiMAX (IEEE 802.16).

The method may begin when a mobile station (e.g., mobile station 18) is in an idle state monitoring the paging channel of its primary BTS, as indicated by block 100. The primary BTS may be in the mobile station's "active set." Thus, the primary BTS could be BTS 12, as shown in FIG. 1, if pilot signal 20 is the strongest pilot signal received by mobile station 18.

At some point, the mobile station prepares to transmit a message over an access channel, as indicated by block 102. The message could be a call original message, e.g., in response to an instruction from a user of the mobile station to originate a call. Alternatively, the message could be a registration message, a data burst message, a page response message, or some other type of message.

In order to select the length of preamble to use with the message, the mobile station determines the distance between it and the primary BTS, as indicated by block 104. The mobile station may do so by determining its location, determining the location of the primary BTS, and calculating the distance between the two locations.

To determine its own location, the mobile station may use a satellite-based positioning system, such as GPS, a terrestrial positioning technology, such as Advanced Forward Link Trilateration (AFLT), or a combination of positioning technologies. To determine the location of the primary BTS, the mobile station may refer to a base station almanac that identifies the locations of BTSs (or, more particularly, the locations of antennas used by the BTSs). The mobile station may receive the base station almanac from wireless telecommunications system, either automatically or upon request by the mobile station.

Once the mobile station has calculated the distance to the primary BTS, the mobile station may determine whether the distance is greater than a threshold distance, $D_T$, as indicated by block 106. If the distance is greater than $D_T$, then the mobile station may select the longer preamble length (PAM_SZ=2), as indicated by block 108. If the distance is less than $D_T$, then the mobile station may select the shorter preamble length (PAM_SZ=1), subject to the consideration of other factors, as described in more detail below.

The threshold distance, $D_T$, could be selected based on how far away a mobile station can be from a BTS and still have that BTS reliably decode an access probe from the mobile station that uses the shorter preamble length. For example, the threshold distance could be a distance corresponding to 30 chips (a distance of about 4.5 miles, assuming a chipping rate of 1.2288 MHz, i.e., assuming that one "chip" is approximately 0.8138 microseconds). However, other threshold distances could be used.

The value of $D_T$ could be provisioned into a mobile station at the time of service initiation, for example, depending on the type of mobile station and/or the type of service plan to which the user subscribes. Alternatively, $D_T$ could be an adjustable parameter that is transmitted by the wireless telecommunications network, for example, based on where a mobile station is operating, the time of day, network conditions, or other factors.

If the distance to the primary BTS is less than $D_T$, then the mobile station may check whether any BTS in the mobile station's neighbor set is a candidate for an idle handoff, as indicated by block 110. For example, if pilot signals 22 and 24 are in the mobile station's neighbor set, then the mobile station may determine the distances to BTSs 14 and 16. This check may be made in order to account for the possibility that the mobile station may undergo an idle handoff to a more distant BTS before the mobile station has a chance to transmit the access probe.

To determine whether any neighbor-set BTS is a candidate for an idle handoff, the mobile station may compare the pilot signal strength that the mobile station measured for its primary BTS to the pilot signal strengths that the mobile station measured for its neighbor-set BTSs. Any neighbor-set BTS that has a pilot signal strength that is greater than the pilot signal strength of the primary BTS may be considered a candidate for an idle handoff. In addition, any neighbor-set BTS that has a pilot signal strength that is less than the primary BTS's pilot signal strength, but differs from the primary BTS's pilot signal strength by less than a threshold signal strength may also considered to be a candidate for an idle handoff. The threshold signal strength could be, for example, 1 dB. However, other values could be used. In addition, a mobile station may use other approaches for determining whether any neighbor-set BTS is a candidate for an idle handoff.

In an exemplary embodiment, the mobile station concludes that no neighbor-set BTS is a candidate for an idle handoff if the following expression holds true for each neighbor-set BTS:

$$S_P - S_N > S_T$$

where $S_p$ is the pilot signal strength that the mobile station measured for the primary BTS, $S_N$ is the pilot signal strength that the mobile station measured for a secondary BTS, and $S_T$ is the threshold signal strength. Any neighbor BTS that does not satisfy the expression may be identified as a candidate BTS for an idle handoff. In the case of CDMA signals, the mobile station may measure the signal strengths as $E_C/I_0$ values, where $E_C$ is the energy per chip and $I_0$ is the interference power density. It is to be understood, however, that the mobile station could measure signal strengths in terms of parameters other than $E_C$ and $I_0$.

If no neighbor-set BTS is a candidate for an idle handoff (i.e., if the pilot signal strength of the primary BTS exceeds the pilot signal strengths of every neighbor-set BTS by more than the threshold signal strength), then the mobile station may select the shorter preamble length (PAM_SZ=1), as indicated by block 112.

On the other hand, if there is a neighbor-set BTS that is a candidate for an idle handoff, then the mobile station may determine whether the distance to the candidate BTS is greater than $D_T$, as indicated by block 114. The mobile station may determine the distance by calculating the distance between its own location (which the mobile station may obtain by using GPS or other positioning technology) and the location of the candidate BTS (which the mobile station may obtain from the base station almanac). If the distance to the candidate BTS is greater than $D_T$, then the mobile station may select the longer preamble length (PAM_SZ=2), as indicated by block 108. If the distance to the candidate BTS is less than $D_T$, then the mobile station may select the shorter preamble length (PAM_SZ=1), as indicated by block 112.

Once the mobile station has selected the preamble length, the mobile station may transmit an access probe (e.g., access probe 25 shown in FIG. 1) that includes the message and a preamble having a length corresponding to the selected PAM_SZ parameter, as indicated by block 116.

In this way, the mobile station may adjust the length of the preamble in the access probe based on the distance to the BTS that would be receiving and decoding the access probe. For shorter distances (e.g., distances less than $D_T$), the mobile station may use a shorter preamble, which may beneficially result in a reduced call set-up time or other response time, as well as reduced occupancy of the access channel. For longer distances (e.g., distances less than $D_T$), the mobile station may use a longer access probe in order to facilitate more reliable decoding by the BTS.

4. Exemplary Mobile Station

Figure 3:
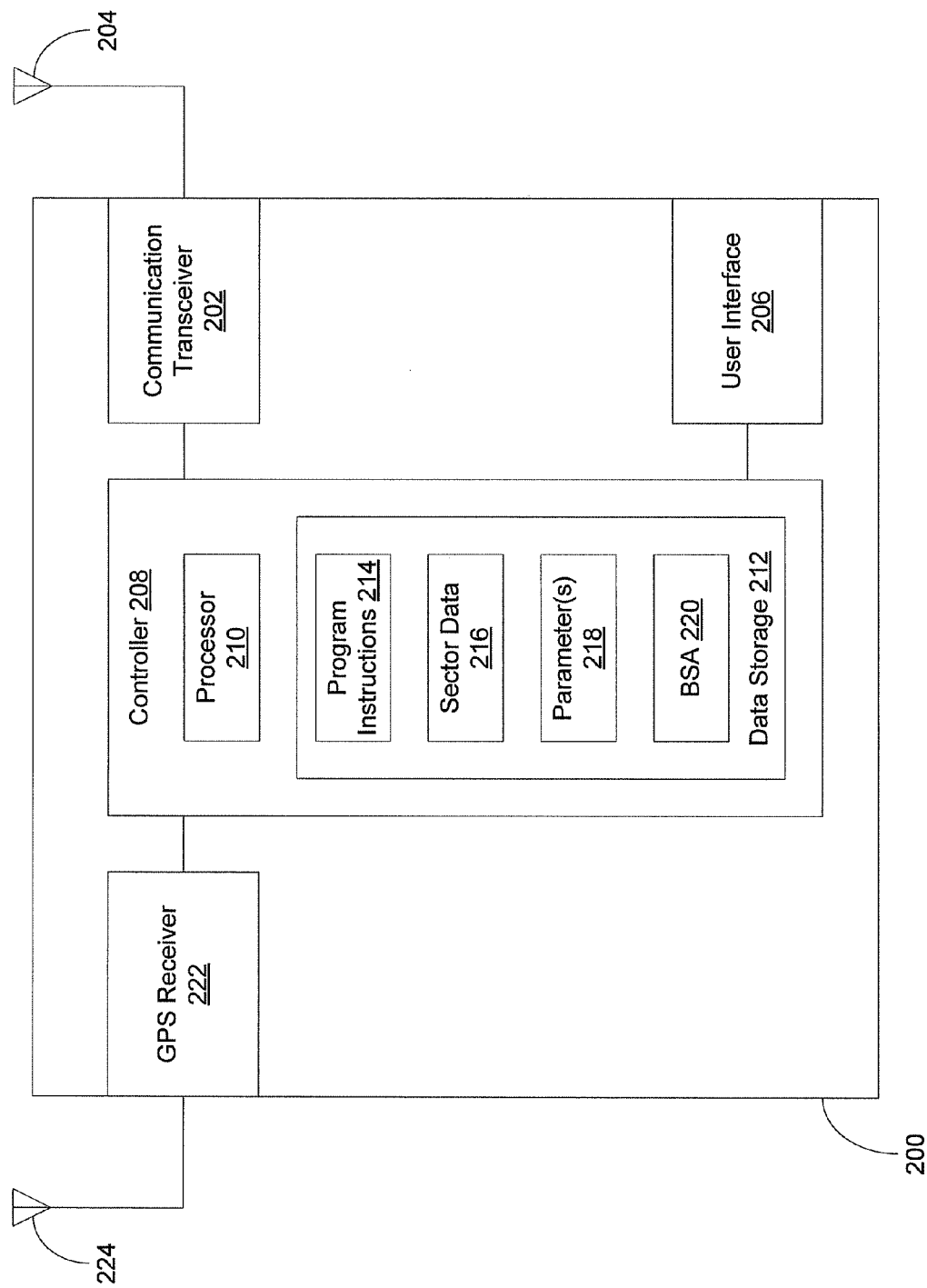
FIG. 3 is a block diagram of a mobile station, in accordance with an exemplary embodiment.

FIG. 3 illustrates an exemplary mobile station 200 that can operate in accordance with the flowchart of FIG. 2. Mobile Station 200 includes a communication transceiver 202 for communicating with one or more sectors in a wireless telecommunications system (e.g., system 10 in FIG. 1) via an antenna 204. More particularly, communication transceiver 202 may function as a transmitter for transmitting wireless signals to one or more sectors and may function as a receiver for receiving wireless signals transmitted by one or more sectors.

Mobile station 200 also includes a user interface 206 for obtaining input from a user of mobile station 200 and for conveying information to the user. Thus, user interface 206 may include a keypad, touch screen, or other controls by which the user may provide input into mobile station 200. For example, user input 206 may include a button that the user can press to originate a call. User interface 206 may also include a display for displaying textual, graphical, or other visual information to the user. Mobile station 200 may also be configured for voice communication. Thus, user interface 206 may include a microphone for receiving audio input from the user and a speaker for conveying audio to the user. Alternatively, mobile station 200 may communicate with an external microphone and/or speaker, for example, via a wireless connection.

The functioning of mobile station 200 may be controlled by a controller 208 coupled to communication transceiver 202 and to user interface 206. Controller 208 may comprise a processor 210 and data storage 212. Data storage 212 may include volatile and/or non-volatile memory. Data storage 212 may store program instructions 214 that are executable by processor 210 to control the functioning of mobile station 200.

Data storage 212 may also store other information. For example, data storage 212 may store sector data 216 regarding the sectors that mobile station 200 is currently monitoring. Thus, when mobile station 200 is in an idle state, sector data 216 may include data regarding a primary sector associated with a primary BTS. The primary BTS may be the BTS that transmits the paging channel that mobile station 200 monitors in the idle state. Mobile station 200 may also periodically measure the signal strength of a pilot channel signal transmitted by the primary BTS. Thus, sector data 216 may identify the primary sector (e.g., by its PN offset), may include information regarding the primary sectors' paging channel being monitored by mobile station 200, and may include a signal strength of the primary sector's pilot channel as measured by mobile station 200. Sector data 216 may also include information data regarding one or more neighbor sectors associated with neighbor BTSs. In particular, sector data 216 may identify neighbor sectors (e.g., by their PN offsets) and may include signal strengths of the neighbor sectors' pilot channels as measured by mobile station 200.

Data storage 212 may also store one or more parameters 218 that are used by program instructions 214. For example, parameters 218 may include one or more distance parameters (e.g., threshold distance, $D_T$, described above for FIG. 2) and one or more signal strength parameters (e.g., threshold signal strength, $S_T$, described above for FIG. 2). Parameters 218 may be stored in data storage 212 after mobile station 200 receives initial or updated values from the wireless telecommunications system. Alternatively, parameters 218 could be provisioned into mobile station 200 in other ways.

Data storage 212 may also store a base station almanac (BSA) 220, which mobile station 200 may receive from the wireless telecommunications system.

Program instructions 214 may be executable by processor 210 so as to cause mobile station 200 to perform the functions illustrated in FIG. 2 and described above. Thus, program instructions 214 may be executable to perform the steps of: (a) determining a distance between mobile station 200 and a primary BTS; (b) selecting a preamble length based, at least in part, on the distance; and (c) controlling communication transceiver 202 so as to transmit the message with a preamble, the preamble having the selected preamble length.

To calculate the distance to the primary BTS, mobile station 200 may determine its location, e.g., based on signals received from a satellite-based positioning system, and mobile station 200 may determine the location of the primary BTS, e.g., by referring to BSA 220. Thus, mobile station 200 may include a GPS receiver 222 for receiving GPS signals via an antenna 224. GPS receiver 222 may be coupled to controller 208. Program instructions 214 may be executable by processor 210 to obtain an estimate of the location of mobile station 200 based on GPS signals received by GPS receiver 222 (the process may also involve communicating with a position determining entity or other entity in the wireless telecommunications system). Program instructions 214 may also be executable by processor 210 to obtain the location of the primary BTS from BSA 220.

To select a preamble length, program instructions 214 may refer to parameters 218, sector data 216, and/or other data stored in data storage 212. For example, program instructions 214 may compare the distance to the primary BTS to one or more distance parameters in parameters 218. Program instructions 214 may also compare signal strengths stored in sector data 216, using one or more signal strength parameters stored in parameters 218.

When the preamble length has been selected, program instructions 214 may be executed by processor 210 to control communication transceiver 202 to transmit a message. For example, controller 208 may receive from user interface 206 a user's request to originate a call, select a preamble length, and then control transceiver 202 to transmit an access probe containing a call origination message preceded by a preamble with the selected preamble length.

5. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method for transmitting a message from a mobile station, said method comprising:
   said mobile station determining a distance between said mobile station and a primary base transceiver station (BTS);
   said mobile station measuring a primary signal strength of a primary pilot signal transmitted by said primary BTS and a secondary signal strength of a secondary pilot signal transmitted by a secondary BTS;
   said mobile station selecting a preamble length from among at least a first preamble length and a second preamble length, wherein said second preamble length is greater than said first preamble length, by a process comprising (i) comparing said distance to a threshold distance, (ii) if said distance is greater than said threshold distance, said mobile station selecting said second preamble length, and (iii) if said distance is less than said threshold distance, said mobile station determining whether said primary signal strength exceeds said secondary signal strength by more than a threshold signal strength; and
   said mobile station transmitting said message with a preamble, said preamble having said selected preamble length.

2. The method of claim 1, further comprising:
   said mobile station monitoring a paging channel associated with said primary BTS.

3. The method of claim 1, wherein said mobile station determining a distance between said mobile station and said primary BTS comprises:
   said mobile station determining a location of said primary BTS.

4. The method of claim 3, wherein said mobile station determining a location of said primary BTS, comprises:
   said mobile station obtaining said location of said primary BTS from a base station almanac.

5. The method of claim 1, wherein said mobile station determining a distance between said mobile station and said primary BTS comprises:
   determining a location of said mobile station using a satellite-based positioning system.

6. The method of claim 1, wherein said mobile station transmitting said message with a preamble comprises:
   said mobile station transmitting an access probe, said access probe including said message and said preamble.

7. The method of claim 6, wherein said preamble precedes said message in said access probe.

8. The method of claim 6, wherein said access probe is encoded by a pseudonoise (PN) code that identifies the primary BTS.

9. The method of claim 6, wherein said message is a call origination message.

10. The method of claim 1, wherein said primary BTS is in an active set maintained by said mobile station and said secondary BTS is in a neighbor set maintained by said mobile station.

11. The method of claim 1, further comprising:
    if said primary signal strength exceeds said secondary signal strength by more than said threshold signal strength, said mobile station selecting said first preamble length; and
    if said primary signal strength does not exceed said secondary signal strength by more than said threshold signal strength, said mobile station determining a secondary distance between said mobile station and said secondary BTS.

12. The method of claim 11, further comprising:
    if said secondary distance is greater than said threshold distance, said mobile station selecting said second preamble length; and
    if said secondary distance is less than said threshold distance, said mobile station selecting said first preamble length.

13. A mobile station, comprising:
    a transceiver for transmitting and receiving wireless signals;
    a processor;
    data storage; and
    a plurality of program instructions stored in said data storage and executable by said processor to perform functions comprising:
    determining a distance between said mobile station and a primary base transceiver station (BTS);
       measuring a primary signal strength of a primary pilot signal transmitted by said primary BTS and a secondary signal strength of a secondary pilot signal transmitted by a secondary BTS;
    selecting a preamble length based, at least in part, on a comparison of said distance to one or more distance parameters and a comparison of said primary signal strength to said secondary signal strength; and
    controlling said transceiver so as to transmit said message with a preamble, said preamble having said selected preamble length.

14. The mobile station of claim 13, further comprising a positioning receiver for receiving signals from a satellite-based positioning system.

15. The mobile station of claim 14, wherein determining a distance between said mobile station and a primary base transceiver station (BTS) comprises:
    using said positioning receiving to obtain a location of said mobile station.

16. The mobile station of claim 13, further comprising a base station almanac stored in said data storage, wherein determining a distance between said mobile station and a primary base transceiver station (BTS) comprises:
    obtaining a location of said primary BTS from said base station almanac.

17. The mobile station of claim 13, wherein said primary BTS is in an active set maintained by said mobile station and said secondary BTS is in a neighbor set maintained by said mobile station.

* * * * *